(12) United States Patent
Choi et al.

(10) Patent No.: US 9,290,053 B2
(45) Date of Patent: Mar. 22, 2016

(54) NON-PNEUMATIC TIRE FOR VEHICLE

(71) Applicant: HANKOOK TIRE CO., LTD., Seoul (KR)

(72) Inventors: Seok Ju Choi, Daejeon (KR); Hak Joo Kim, Daejeon (KR); Man Seop Kim, Daejeon (KR); Kil Ju Ko, Daejeon (KR); Ki Ho Kang, Daejeon (KR)

(73) Assignee: Hankook Tire Co., Ltd., Seoul (KR)

( * ) Notice: Subject to any disclaimer, the term of this patent is extended or adjusted under 35 U.S.C. 154(b) by 0 days.

(21) Appl. No.: 14/521,590

(22) Filed: Oct. 23, 2014

(65) Prior Publication Data
US 2015/0122382 A1    May 7, 2015

(30) Foreign Application Priority Data

Nov. 6, 2013    (KR) ........................ 10-2013-0134157

(51) Int. Cl.
*B60C 7/18*    (2006.01)
*B60C 7/14*    (2006.01)
*B60C 7/22*    (2006.01)

(52) U.S. Cl.
CPC ... *B60C 7/14* (2013.01); *B60C 7/18* (2013.01); *B60C 7/22* (2013.01); *B60C 2007/107* (2013.04); *B60C 2007/146* (2013.04)

(58) Field of Classification Search
CPC ............. B60C 7/10; B60C 7/12; B60C 7/14; B60C 7/18; B60C 2007/107; B60C 2007/146
See application file for complete search history.

(56) References Cited

U.S. PATENT DOCUMENTS

| 7,032,634 B2 * | 4/2006 | Laurent .................... B60C 7/10 152/11 |
| 7,143,797 B2 * | 12/2006 | Vannan .................... B60C 7/10 152/11 |
| 7,743,806 B2 * | 6/2010 | Abe ........................ B60C 7/102 152/21 |

(Continued)

FOREIGN PATENT DOCUMENTS

| EP | 2418098 | 2/2012 |
| KR | 2004-0027984 | 4/2004 |

(Continued)

OTHER PUBLICATIONS

European Search Report, issued in the corresponding European application serial No. EP 14190439, dated Apr. 8, 2015, 6 pages.

*Primary Examiner* — John Walters
*Assistant Examiner* — James Triggs
(74) *Attorney, Agent, or Firm* — Hamre, Schumann, Mueller & Larson, P.C.

(57) ABSTRACT

A non-pneumatic tire for a vehicle is disclosed. The non-pneumatic tire includes a tread, a rim part, inside and outside annular bands, a spoke member, and a pair of protective films. The tread comes into contact with a road surface. The rim part is connected to the axle of a vehicle. The inside and outside annular bands are disposed between the tread and the rim part, and are coaxially spaced apart from each other. The spoke member includes supports disposed in a predetermined pattern and configured to connect the inside and outside annular bands, and openings defined by the supports. The pair of protective films are disposed at both ends of the tire in the widthwise direction of the tire, and prevents foreign substances from infiltrating into the openings of the spoke member. The protective films are made of the same material as the spoke member and integrated with the spoke member.

11 Claims, 4 Drawing Sheets

(56) References Cited

U.S. PATENT DOCUMENTS

| | | | |
|---|---|---|---|
| 8,215,351 B2 * | 7/2012 | Thompson | B60C 7/18 152/152 |
| 8,555,941 B2 * | 10/2013 | Perron | B60C 7/18 152/246 |
| 8,609,220 B2 * | 12/2013 | Summers | C22C 1/08 152/246 |
| 8,720,504 B2 * | 5/2014 | Benzing, II | B60C 11/0311 152/155 |
| 2008/0314486 A1 | 12/2008 | Manesh et al. | |

FOREIGN PATENT DOCUMENTS

| | | |
|---|---|---|
| KR | 2008-0038274 | 5/2008 |
| KR | 1043001 | 6/2011 |
| WO | WO 2003/018332 | 3/2003 |

* cited by examiner

NON-PNEUMATIC TIRE FOR VEHICLE

CROSS-REFERENCE TO RELATED APPLICATIONS

This non-provisional application claims priority to Korean Patent Application No. 10-2013-0134157, filed on Nov. 6, 2013, and all the benefits accruing therefrom under U.S.C. §119, the entire contents of which is incorporated herein in its entirety by reference.

BACKGROUND

1. Technical Field

The present invention relates to a non-pneumatic tire for a vehicle and, more particularly, to a non-pneumatic tire for a vehicle, which is capable of providing controllability similar to that of a pneumatic tire without utilizing air pressure and also preventing foreign substances from being caught therein.

2. Description of the Related Art

Currently, most vehicles are chiefly using pneumatic tires. However, such pneumatic tires are problematic in that the structures thereof are complicated, a large number of steps, for example, eight or more, are required for a process of manufacturing such a pneumatic tire, a large amount of toxic substance is emitted accordingly, users suffer from the inconvenience of management in which the air pressures of the tires essential for the performance and safety of the tires should be frequently inspected, and the pneumatic tires entail a problem with safety in which the tires are damaged due to puncture from a foreign substance or impact while in motion, thus resulting in traffic accidents.

In order to overcome the problems of pneumatic tires, airless tires have been developed, and various types of non-pneumatic tires have been proposed.

For non-pneumatic tires capable of replacing pneumatic tires, Korean Patent Application Publication No. 2006-0051513 discloses a non-pneumatic flexible tire that supports a load on the tire using a plurality of support members including many layers of staple, and Korean Patent Application Publication No. 2008-0038274 discloses a non-pneumatic tire that includes a body made of an elastic material, a circumferentially extending crown part configured to function as a ground contact surface, and extending sidewalls attached to the body and the crown part. Korean Patent Application Publication No. 2004-0027984 discloses a non-pneumatic tire that includes a reinforced annular band configured to support a load exerted onto the tire, and a plurality of web spokes configured to transfer load force between the annular band and a wheel or hub in a tensile state. Additionally, Korean Patent No. 1043001 discloses an airless tire that is configured to perform a buffering action via a honeycomb-shaped buffering unit and sustain a pressure applied to the tire.

In the non-pneumatic tire including a plurality of web spokes, structure reinforcing elements are contained in a tread that come into contact with the web spokes and a ground surface, and this configuration sustains the load of a vehicle and also performs a function similar to that of the air pressure of a pneumatic tire. However, this non-pneumatic tire is problematic in that gaps are open among the web spokes, and thus the cracks of the spokes are caused when foreign substances, such as sand and gravel, infiltrate into the gaps from the outside via the gaps, thereby reducing the lifespan of the tire.

SUMMARY

The present disclosure is directed to the provision of a non-pneumatic tire that is provided with protective films capable of covering openings among the supports of a spoke member, and thus can prevent foreign substances from being caught among the supports of the spoke member, thereby improving the durability and lifespan performance of the tire.

In accordance with an aspect of the present invention, there is provided a non-pneumatic tire for a vehicle, including a tread configured to come into contact with a road surface; a rim part connected to an axle of a vehicle; inside and outside annular bands disposed between the tread and the rim part, and coaxially spaced apart from each other; a spoke member including supports disposed in a predetermined pattern, and configured to connect the inside and outside annular bands; and openings defined by the supports; and a pair of protective films disposed at both ends of the tire in the widthwise direction of the tire, and configured to prevent foreign substances from infiltrating into the openings of the spoke member; wherein the protective films are made of the same material as the spoke member and integrated with the spoke member; and wherein the protective films are disposed at both ends of the inside and outside annular bands inside the spoke member in the widthwise direction of the tire, or at both ends of the inside and outside annular bands outside the spoke member in the widthwise direction of the tire.

BRIEF DESCRIPTION OF THE DRAWINGS

The above and other objects, features and advantages of the present invention will be more clearly understood from the following detailed description taken in conjunction with the accompanying drawings, in which.

DETAILED DESCRIPTION

Embodiments of the present invention will be described in detail below with reference to the accompanying drawings. While the inventions(s) will be described in conjunction with exemplary embodiments, it will be understood that the present description is not intended to limit the invention(s) to those exemplary embodiments. On the contrary, the invention(s) is/are intended to cover the exemplary embodiments as well as various alternatives, modifications, equivalents, and other embodiments; which may be included within the spirit and scope of the invention as defined by the accompanying claims.

The same reference symbols will be assigned to the same components throughout the accompanying drawings. Furthermore, in the following detailed description, detailed descriptions of related well-known components or functions that may make the gist of the present invention obscure will be omitted.

The terminology used herein is for the purpose of describing particular embodiments only and is not intended to be limiting of the invention. As used herein, the singular forms "a," "an" and "the" are intended to include the plural forms as well, unless the context clearly indicates otherwise.

It will be further understood that the terms "comprises" and/or "comprising," when used in this specification, specify the presence of stated features, regions, integers, steps, operations, elements, and/or components, but do not preclude the presence or addition of one or more other features, regions, integers, steps, operations, elements, components, and/or groups thereof.

Figure 1:
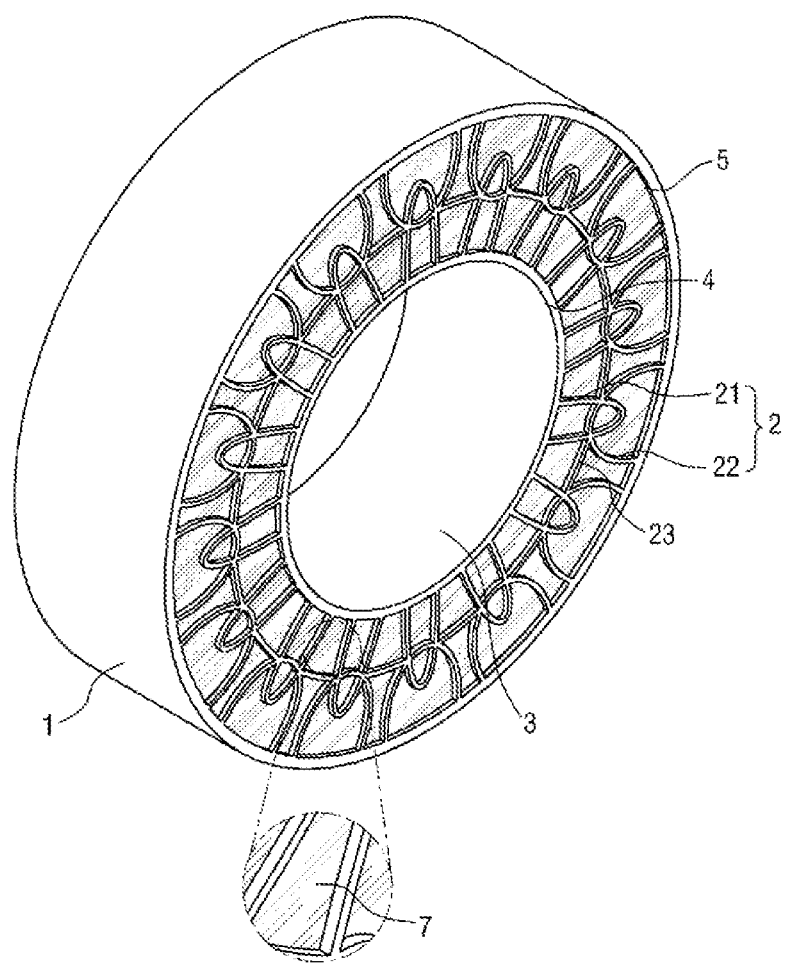
FIG. 1 is a schematic perspective view of a non-pneumatic tire according to an embodiment of the present invention.
Figure 2:
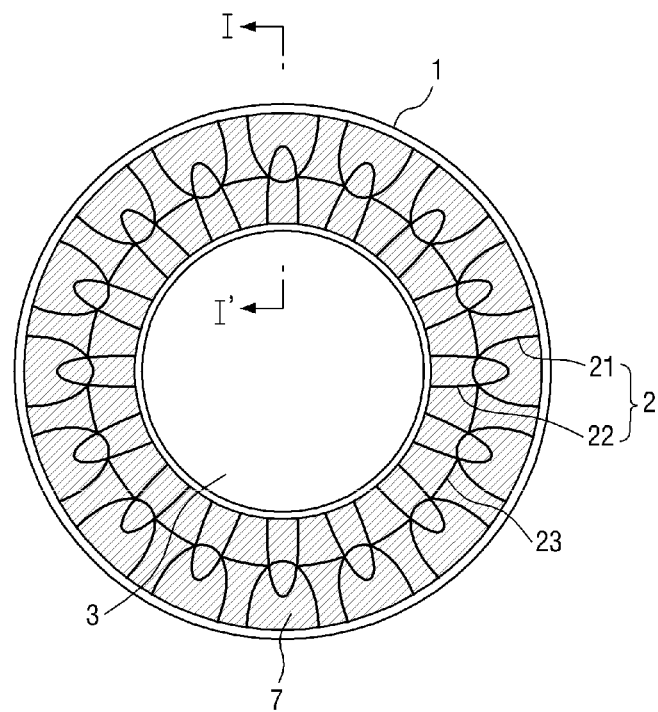
FIG. 2 is a front view of the non-pneumatic tire illustrated in FIG. 1.
Figure 3:
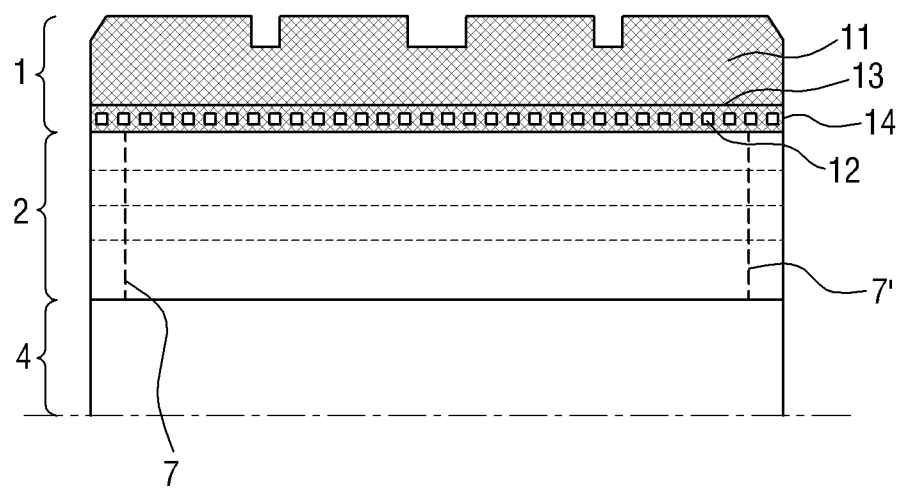
FIG. 3 is a schematic cross-sectional view of the non-pneumatic tire illustrated in FIG. 1.

FIGS. 1 to 3 are diagrams illustrating a non-pneumatic tire according to an embodiment of the present invention. Referring to FIG. 1, the non-pneumatic tire according to this embodiment of the present invention includes a tread 1 configured to come into contact with a road surface; a rim part 3 connected to the axle of a vehicle; an inside annular band 4 and an outside annular band 5 disposed between the tread and the rim part, and coaxially spaced apart from each other; a spoke member 2 including supports 21 and 22 formed in a predetermined pattern and configured to connect the inside and outside annular bands 4 and 5, and openings 20 defined by the supports; and a pair of protective films 7 and 7' disposed at both ends of the tire in the widthwise direction of the tire, and configured to prevent foreign substances from infiltrating into the openings 20 of the spoke member 2. As illustrated in FIG. 1, the protective films 7 and 7' may be disposed at both ends of the inside and outside annular bands 4 and 5 inside the spoke member 2 in the widthwise direction of the tire, or at both ends of the spoke member 2 on an inside in the widthwise direction of the tire. Furthermore, the protective films 7 and 7' are disposed opposite each other in the widthwise direction of the tire, and may be integrated with the inside and outside annular bands 4 and 5.

The protective films 7 and 7' may be formed to cover the individual openings 20 among the supports 21 and 22 of the spoke member 2, or may be formed to cover the overall left and right ends of the spoke member 2 in the widthwise direction thereof.

The protective films 7 and 7' are disposed at both ends of the spoke member 2 on an inside in the widthwise direction of the tire, as described above, and function to prevent foreign substances, such as soil, sand, gravel, snow and the like, from infiltrating from the surface of a road into the openings 20 between the supports 21 and 22 of the spoke member 2 while the non-pneumatic tire according to this embodiment of the present invention is in motion.

The spoke member 2 includes the supports 21 and 22 formed in a predetermined pattern and the openings 20 defined by the supports. In an embodiment of the present invention, the pattern of the spoke member 2 may include the outside semicircular support 21 configured to come into contact with the outside annular band 5; and the inside semicircular support 22 configured to come into contact with the inside annular band 4 and cross the outside semicircular support 21 on the inside thereof.

In an embodiment of the present invention, the protective films 7 and 7' may be made of a thermoplastic resin, a thermosetting resin, or a mixture thereof. In an embodiment of the present invention, the protective film 7 and 7' may be made of the same material as the spoke member, or a composite material. The protective films 7 and 7' may be fabricated using, for example, polyester, polypropylene, polyacetal, aramid or polyamide. The resin of which the protective films 7 and 7' are made may contain a reinforcing material, for example, glass fiber, carbon fiber, or aramid fiber, in order to improve mechanical strength.

The spoke member 2 may include a plurality of spoke members that are disposed at equal angle intervals between the inside and outside annular bands 4 and 5 so that the predetermined pattern is repeated.

In an embodiment of the present invention, neighboring inside semicircular supports 22 may be configured such that the inside ends thereof that come into contact with an inside annular band 4 are spaced apart at regular intervals, as illustrated in FIG. 2.

FIG. 3 is a schematic cross-sectional view of the non-pneumatic tire illustrated in FIG. 1. Referring to FIG. 3, the non-pneumatic tire according to this embodiment of the present invention includes the tread 1 configured to come into contact with a ground surface, and the spoke member 2 configured to support a load. As indicated by lateral dotted lines in FIG. 3, spoke members 2 have intersections that are formed by outside and inside semicircular supports 21 and 22. In FIG. 3, intersections at which the outside and inside semicircular supports 21 and 22 of the spoke members 2 cross one another are connected by a median dotted line.

In an embodiment of the present invention, a tread 1 includes a viscoelastic material portion 11 made of a rubber or plastic material and configured to directly come into contact with a ground surface, and a reinforcing portion 14 disposed inside the viscoelastic material portion 11 and configured to include structural reinforcing elements 12. Examples of the reinforcing elements 12 include steel wires, steel belts, steel rings and steel codes, but the reinforcing elements 12 are not necessarily limited thereto. The tread 1 may be fabricated using a polyester elastomer or resin, such as polyurethane, or rubber according to its application. Meanwhile, a non-pneumatic tire according to an embodiment of the present invention may have a tread pattern in the surface thereof that comes into contact with a ground surface.

In an embodiment, a spoke member 2 may further include a connection portion 23 that is disposed in the circumferential direction of a tire and connects intersections between supports 21 and 22. When the intersections between supports 21 and 22 are connected to each other by the connection portion 23, a more reinforced structure can be achieved.

Figure 4:
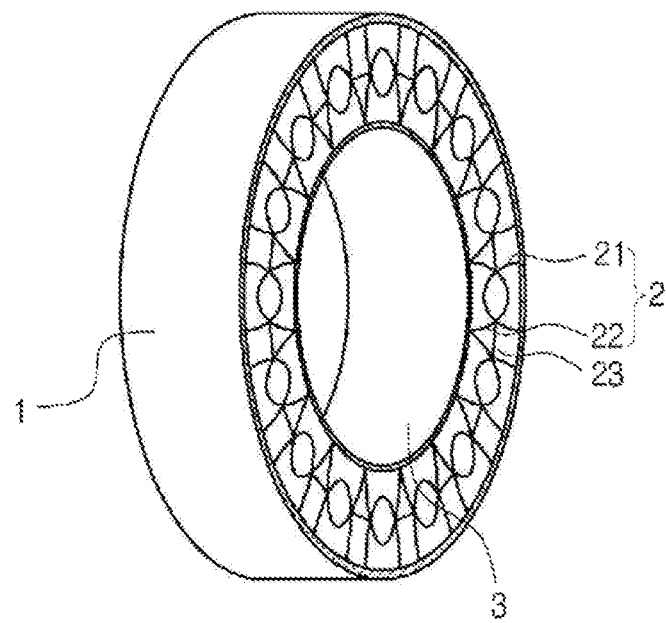
FIG. 4 is a schematic perspective view of a non-pneumatic tire according to another embodiment of the present invention, with protective films being removed therefrom.
Figure 5:
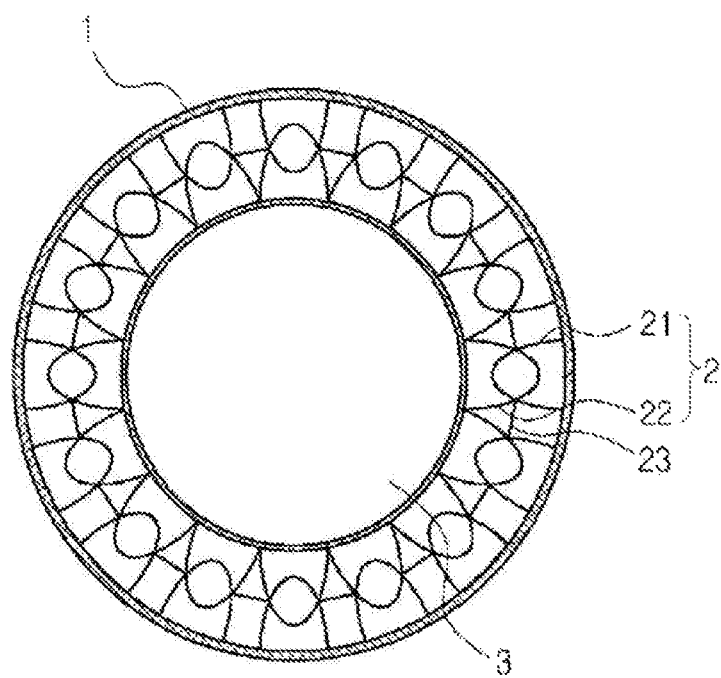
FIG. 5 is a front view of the tire illustrated in FIG. 4.

In another embodiment of the present invention, neighboring inside semicircular supports 22 may be configured such that the inside ends thereof that come into contact with an inside annular band 4 come into contact with each other, as illustrated in FIGS. 4 and 5. In this case, neighboring outside semicircular supports 21 may be configured such that the outside ends thereof that come into contact with an outside annular band 5 are spaced apart at regular intervals.

In still another embodiment (not illustrated), neighboring inside semicircular supports are configured such that the inside ends thereof that come into contact with an inside annular band come into contact with each other, and neighboring outside semicircular supports are configured such that the outside ends thereof that come into contact with an outside annular band also come into contact with each other.

Figure 6:
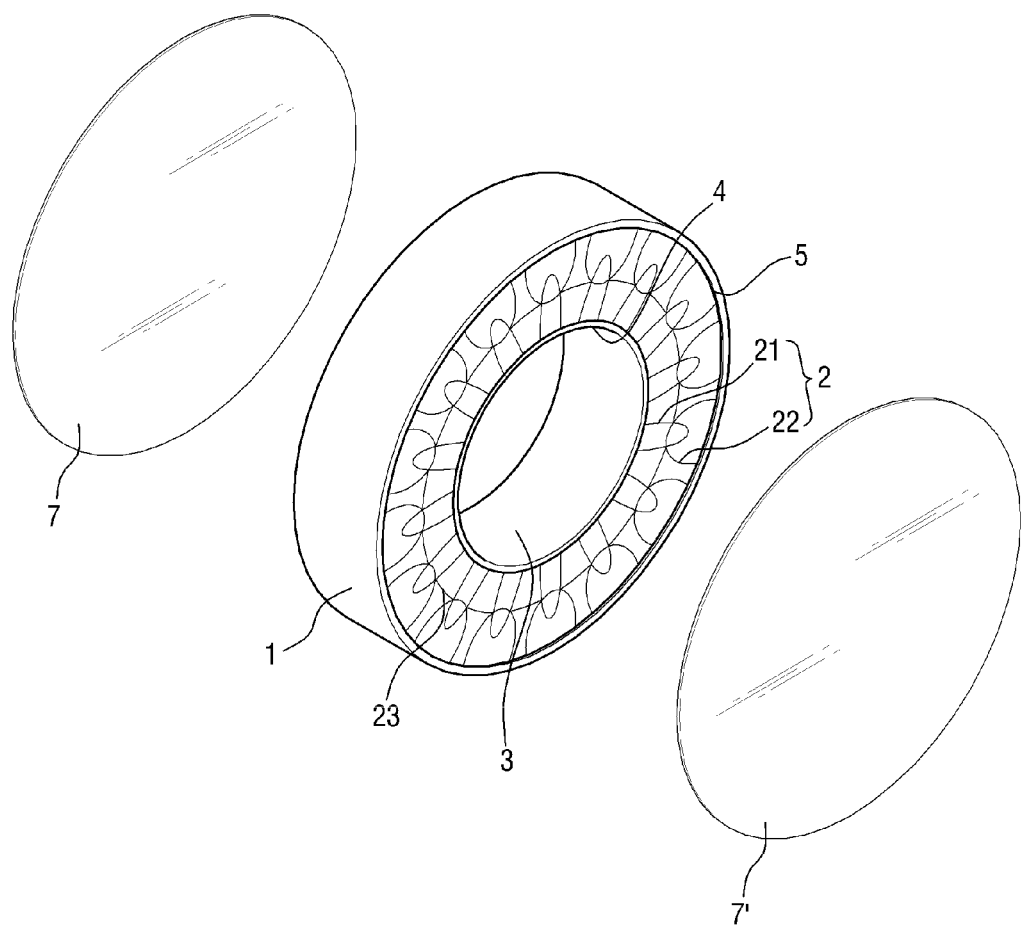
FIG. 6 is an exploded perspective view of a non-pneumatic tire according to still another embodiment of the present invention, with protective films being separated therefrom.

FIG. 6 is a schematic perspective view of a non-pneumatic tire according to yet another embodiment of the present invention, with protective films being separated therefrom. In the non-pneumatic tire according to this embodiment of the present invention, protective films 7 and 7' may be formed outside the left and right ends of the spoke member 2. In this case, the protective films 7 and 7' may be formed of transparent, translucent or opaque thin films.

EXAMPLE

The comparisons of static characteristic performance and noise performance between a non-pneumatic tire of the present invention in which protective films are disposed at the left and right ends of a spoke member and a conventional tire in which protective films are not provided are listed in the following Table 1:

TABLE 1

|  | Comparative example | Example |
|---|---|---|
| Actual contact area (cm$^2$) | 103 | 100 |
| Deformation (mm) | 35 | 34 |
| Noise SPL (dBA) | 50 | 42 |

[Performance evaluation methods]
Actual contact area: Ink was applied to treads, the tires were vertically pressed onto paper, and then contact areas were measured.
Deformation: The distance between a ground surface and the axis of the hub of each of the tires when the tread of the tire was in contact with the ground surface or a flat surface without a load being applied thereto in accordance with a method of testing the static characteristics of a tire was set as a reference, the distance over which the axis of the hub had moved toward the ground surface due to the application of a load when the tire was vertically pressed by applying the load was measured, and then the measured distance was indicated as the deformation.
Noise SPL: Noise sound pressure levels (SPLs) were evaluated based on the JASO C606-81 test method.

As can be seen from the results in Table 1, the non-pneumatic tire having protective films according to the embodiment of the present invention exhibits similar performance in terms of an actual contact area and deformation, but exhibits superior performance in term of a reduction in noise.

A non-pneumatic tire according to an embodiment of the present invention includes protective films capable of preventing foreign substances from infiltrating into openings among the supports of a spoke member, and thus can prevent damage to the surface of a spoke or the occurrence of a crack from occurring due to the infiltration of foreign substances, thereby improving the durability and lifespan of the tire.

A non-pneumatic tire according to an embodiment of the present invention can prevent foreign substances caught in a spoke member from hitting a pedestrian due to the running of a vehicle, and can reduce noise that occurs in the spoke member due to the rotation of the tire, thus contributing to an improvement in riding comfort.

The foregoing description is merely an illustration of the technical spirit of the present invention. It will be apparent to those having ordinary knowledge in the technical field to which the present invention pertains that various modifications and variations are possible without departing from the scope of the present invention. Therefore, the range of protection of the present invention should be defined based on the attached claims, and also all technical spirits equivalent to the claims should be construed as being included in the range of protection of the present invention.

What is claimed is:

1. A non-pneumatic tire for a vehicle, comprising:
   a tread configured to come into contact with a road surface;
   a rim part connected to an axle of a vehicle;
   inside and outside annular bands disposed between the tread and the rim part, and coaxially spaced apart from each other;
   a spoke member comprising:
      supports disposed in a predetermined pattern, and configured to connect the inside and outside annular bands; and
      openings defined by the supports; and
   a pair of protective films disposed at both ends of the tire in a widthwise direction of the tire, and configured to prevent foreign substances from infiltrating into the openings of the spoke member;
   wherein the protective films are made of a same material as the spoke member and integrated with the spoke member; and
   wherein the protective films are disposed at both ends of the inside and outside annular bands inside the spoke member in the widthwise direction of the tire, or at both ends of the inside and outside annular bands outside the spoke member in the widthwise direction of the tire.

2. The non-pneumatic tire of claim 1, wherein the spoke member comprises:
   an outside semicircular support configured to come into contact with the outside annular band; and
   an inside semicircular support configured to come into contact with the inside annular band and cross the outside semicircular support 21 on an inside thereof.

3. The non-pneumatic tire of claim 2, wherein the spoke member comprises a plurality of spoke members that are repeatedly disposed at equal angle intervals between the inside annular band and the outside annular band.

4. The non-pneumatic tire of claim 3, wherein neighboring inside semicircular supports of the spoke members are configured such that inside ends of the neighboring inside semicircular supports that come into contact with the inside annular band are spaced apart at regular intervals.

5. The non-pneumatic tire of claim 3, wherein:
   neighboring inside semicircular supports of the spoke members are configured such that inside ends of the neighboring inside semicircular supports that come into contact with the inside annular band come into contact with each other; and
   neighboring outside semicircular supports of the spoke members are configured such that outside ends of the neighboring outside semicircular supports that come into contact with the outside annular band are spaced apart at regular intervals.

6. The non-pneumatic tire of claim 3, wherein:
   neighboring inside semicircular supports of the spoke members are configured such that inside ends of the neighboring inside semicircular supports that come into contact with the inside annular band come into contact with each other; and
   neighboring outside semicircular supports of the spoke members are configured such that outside ends of the neighboring outside semicircular supports that come into contact with the outside annular band also come into contact with each other.

7. The non-pneumatic tire of claim 1, wherein the protective films are made of a thermoplastic resin, a thermosetting resin, or a mixture thereof.

8. The non-pneumatic tire of claim 1, wherein the tread comprises a viscoelastic material portion made of a rubber or plastic material and configured to directly come into contact with a ground surface, and a reinforcing portion disposed inside the viscoelastic material portion and configured to include structural reinforcing elements.

9. The non-pneumatic tire of claim 1, wherein the spoke member further comprises a connection portion that is disposed in a circumferential direction of the tire and that connects intersections between the supports.

10. The non-pneumatic tire of claim 1, wherein the protective films are integrated with the inside and outside annular bands, respectively.

11. The non-pneumatic tire of claim 1, wherein the protective films additionally contain glass fiber, carbon fiber, or aramid fiber.

* * * * *